(12) United States Patent
Neiderman et al.

(10) Patent No.: US 6,899,540 B1
(45) Date of Patent: May 31, 2005

(54) THREAT IMAGE PROJECTION SYSTEM

(75) Inventors: Eric C. Neiderman, Mullica Hill, NJ (US); James L. Fobes, Absecon, NJ (US)

(73) Assignee: The United States of America as represented by the Secretary of Transportation, Washington, DC (US)

( * ) Notice: Subject to any disclaimer, the term of this patent is extended or adjusted under 35 U.S.C. 154(b) by 0 days.

(21) Appl. No.: 09/126,385

(22) Filed: Jul. 30, 1998

(51) Int. Cl.$^7$ .............................................. G09B 14/00
(52) U.S. Cl. ...................................................... 434/219
(58) Field of Search ................................ 434/219, 262, 434/269, 221, 226; 378/1; 705/13

(56) References Cited

U.S. PATENT DOCUMENTS 4,979,137 A * 12/1990 Gerstenfeld et al. ........ 364/578
5,243,693 A * 9/1993 Maron ......................... 345/435
5,660,549 A * 8/1997 Witt, III ...................... 434/226
5,882,206 A * 3/1999 Gillio ........................... 434/262

* cited by examiner

Primary Examiner—John Edmund Rovnak
(74) Attorney, Agent, or Firm—Otto M. Wildensteiner

(57) ABSTRACT

A means for training and testing baggage screening machine operators. The invention is a computer system which causes the baggage screening monitor to show computer-generated (i.e. simulated) contraband items in a piece of baggage. This can be done in one of two ways: the image of the contraband item can be superimposed on the image of an actual piece of baggage being screened so that it appears to be within the piece of baggage, or the image of an entire piece of baggage containing a contraband item can be displayed. The invention allows the operator's proficiency in spotting contraband items to be evaluated and it can be used for training a new operator as well as for providing continued proficiency training and evaluation.

16 Claims, 6 Drawing Sheets

THREAT IMAGE PROJECTION SYSTEM

STATEMENT OF GOVERNMENT INTEREST

The present invention may be made or used by or on behalf of the Government of the United States without the payment of any royalties thereon or therefor.

BACKGROUND

Baggage screening is conducted at all major airports today. It usually takes the form of an X-ray machine which allows the user to view the contents of carry-on baggage in order to detect any weapons or other contraband. While a metal pistol or knife is obvious and easy to see, explosive devices have gotten more sophisticated and hard to spot. Some devices have been disguised as electronic gear such as personal portable radios or tape players. Such a device is difficult to recognize and distinguish from a real radio or tape player, even for an experienced user.

A further problem is that the job of baggage screening can become repetitious, leading to lapses in attention during which potentially dangerous items may be inadvertently allowed on board an aircraft.

While it is possible to have someone periodically try to breach the baggage screening security, in time a single person would begin to be recognized by the users and they would increase their attention whenever that person came to their machine. Thus it would require more than one person, thereby raising its cost. Furthermore, if the users's performance were to be quantified, the costs and inconvenience would increase considerably.

OBJECTS OF THE PRESENT INVENTION

Accordingly, it is an object of the present invention to provide a means for training a baggage screening machine user.

It is a further object of the present invention to provide such a means that can be integrated into present baggage screening machines.

It is a further object to provide such a means that allows a variety of simulated contraband or other items to appear to be in luggage being screened.

It is a further object to provide such a means that allows an entire piece of simulated baggage to appear to be within the screening machine.

It is a further object to provide such a means that allows the simulated contraband or other items to be made to appear randomly or on a selectively variable basis.

SUMMARY

Briefly, the present invention comprises a computer-implemented means for projecting the simulated image of contraband or other items on a baggage screening monitor. This is done by either overlaying a computer-generated image of a contraband or other item onto the image of the baggage being screened, or by substituting the image of an entire piece of baggage which contains contraband for the image of the baggage being screened. There is also provision for monitoring the performance of the machine user (i.e. determining the percentage of items found as well as the number of false alarms). The system can be used both for training new users as well as for maintaining the proficiency of experienced users. It can also be used for demonstrating new pieces of contraband items as they are discovered.

DESCRIPTION OF THE PREFERRED EMBODIMENT

The following description is directed to an X-ray machine system. However, it can be applied with only minor modification to other types of security equipment producing a visual image, such as computed tomography or millimeter-wave personnel screening.

Figure 1:
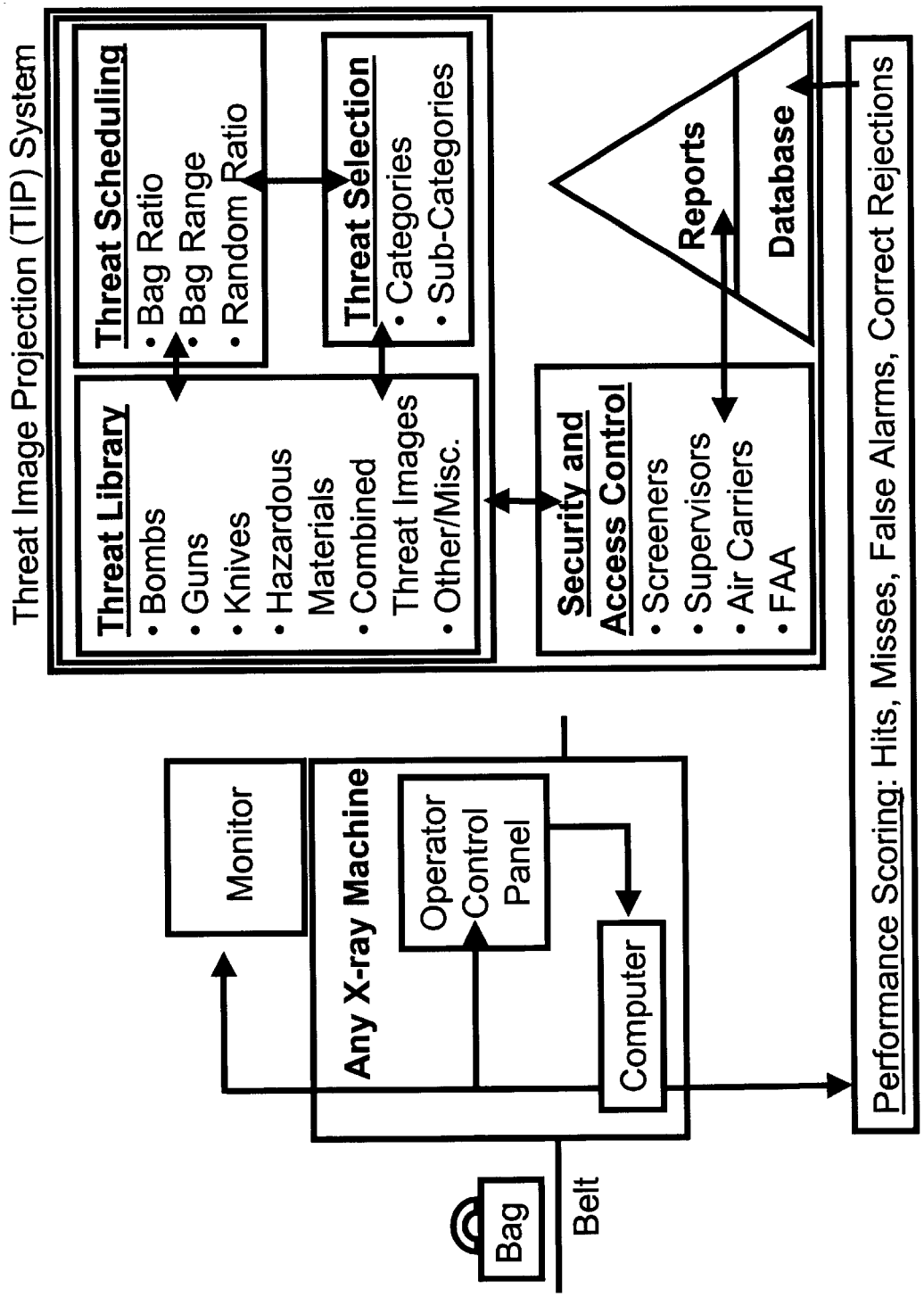
FIG. 1 shows an overall layout of the system of the present invention.

FIG. 1 shows the overall layout of the system of the present invention in block diagram form. As can be seen, prior art baggage screening machines comprise an X-ray machine 1 which contains within it computer 2 which generates an image on monitor 3 of the contents of baggage item 4 on belt 5 as baggage item 4 goes through X-ray machine 1.

The present invention comprises a series of subroutines broadly labelled 6 which are incorporated into computer 2. These subroutines are generally categorized as security and access control; machine operation, threat projection, and user feedback; database, performance reports, and data downloading; maintaining user records and passcodes; and selecting and scheduling threats and updating the machine site and location data.

Broadly, the system of the present invention can be thought of as having three major functional aspects: (1) security of and access to the X-ray machine, (2) control and selection of the simulated threats that are presented, and (3) performance monitoring, data collection, and reporting.

Figure 2:
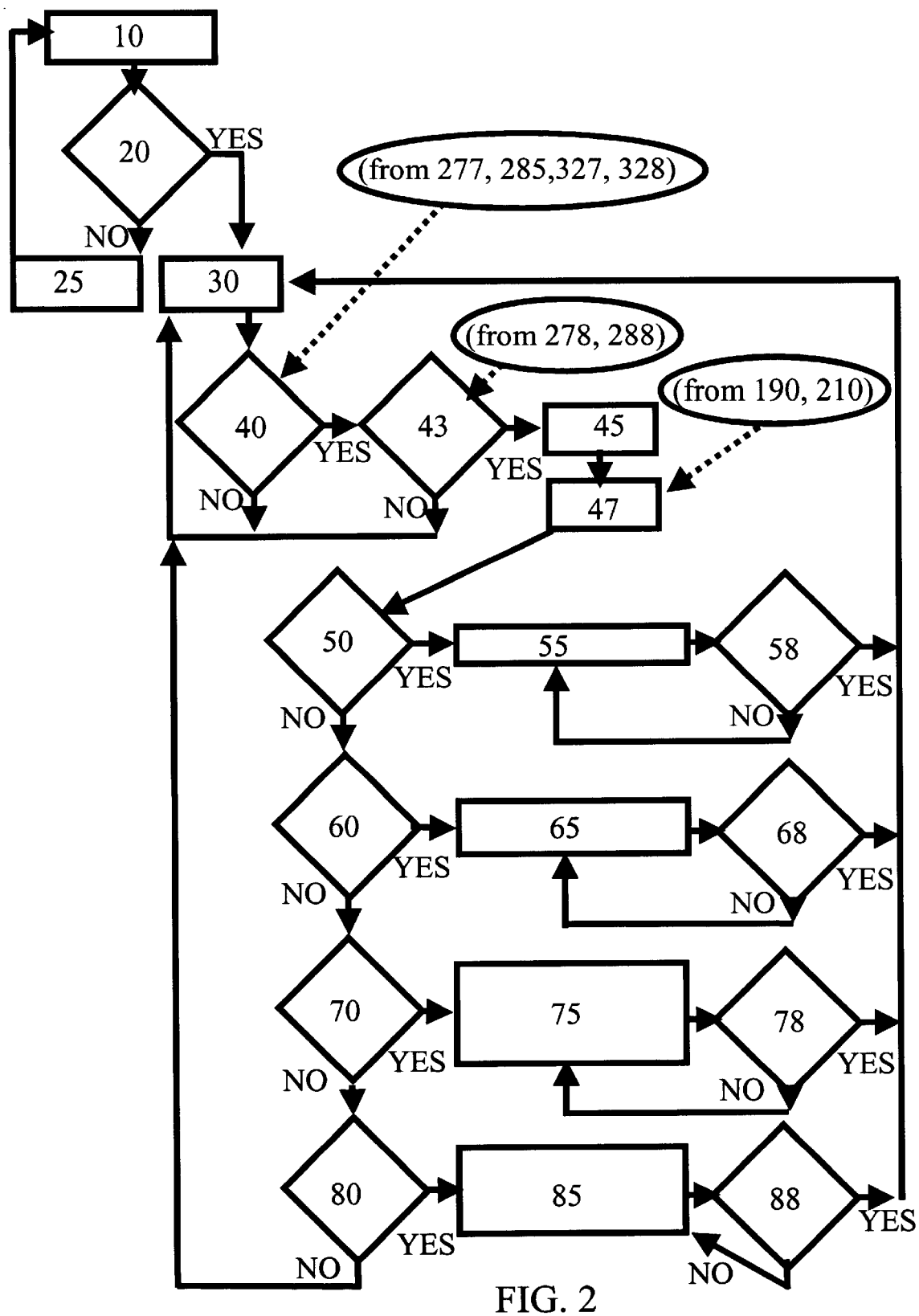
FIG. 2 shows the flow chart of the security and access control subroutines of the system of the present invention.

Referring to FIG. 2, the security and access control subsystem, the user starts the X-ray machine (block 10) using the key in the user control panel. Once the key is turned, the X-ray machine goes through a series of self-diagnostic tests and confirms that it is initialized (block 20) and ready to scan bags. If the initialization fails ("NO" branch), system flow proceeds to block 25, and the user performs the machine manufacturer's troubleshooting procedures to diagnose the initialization problem. If the initialization in block 10 succeeds, process flow proceeds to block 30 and the login screen appears on the X-ray machine monitor. The user is queried in block 40 to type his user identification number, which is compared to information in the user ID master file (blocks 277, 285, 327, 328). If the user fails to type his correct user identification number after three tries ("NO" branch), process flow returns to block 30 and the login screen appears anew. If the user types a valid user identification number, then process flow proceeds to block 43. In block 43 the user must type his passcode, which is compared to information in the user passcode master file (blocks 278, 288), to gain access to the system. If the user fails to type his correct passcode after three tries ("NO" branch), process flow returns to block 20 and the login screen appears anew. If the user correctly types his passcode, then process flow proceeds to block 45 and the user login is verified. At this point, the user is recognized by the initial access and user verification component of the system and can proceed to the next level of security checks before being allowed to use the machine. In block 47 the user's name appears on the X-ray machine monitor. The displayed name can then be checked by a security supervisor to further ensure that the person operating the X-ray machine is, in fact, the person who is logged in (i.e., that the user ID and passcode have not been compromised). When the name is displayed on the X-ray machine monitor, the system also displays a warning (from blocks 190, 210) if screener performance data have not been downloaded.

The remaining blocks in FIG. 2, 50 through 88, ascertain the user's access level and permit use of the related system features. Block 50 tests if the user is a screener (i.e., level 1 access). If the answer is "YES" process flow proceeds to block 55 where the individual is granted access to operate the machine (described in FIG. 3). The process flow then proceeds to block 58 which permits the user to continue ("NO" branch) or to log out of the system ("YES" branch). If the user chooses to log out, process flow returns to block 30 and the login screen appears.

If the test in block 50 indicates that the individual is not a screener ("NO" branch) then the process flow continues to block 60. Block 60 tests if the user is a checkpoint security screener (i.e., level 2 access). If the answer is "YES" process flow proceeds to block 65 where the individual is granted access to operate the level 2 machine features. The process flow then proceeds to block 68 which permits the user to continue ("NO" branch) or to log out of the system ("YES" branch). If the user chooses to log out, process flow returns to block 30 and the login screen appears.

If the test in block 60 indicates that the individual is not a checkpoint security supervisor ("NO" branch) then the process flow continues to block 70. Block 70 tests if the user is a guard company or air carrier manager (i.e., level 3 access). If the answer is "YES" process flow proceeds to block 75 where the individual is granted access to operate the level 3 machine features. The process flow then proceeds to block 78, which permits the user to continue ("NO" branch) or to log out of the system ("YES" branch). If the user chooses to log out, process flow returns to block 30 and the login screen appears.

If the test in block 70 indicates that the individual is not a guard company or air carrier manager ("NO" branch) then the process flow continues to block 80. Block 80 tests if the user is an FAA Federal Security Manager (i.e., level 4 access). If the answer is "YES" process flow proceeds to block 85 where the individual is granted access to operate the level 4 machine features. The process flow then proceeds to block 88, which permits the user to continue ("NO" branch) or to log out of the system ("YES" branch). If the user chooses to log out, process flow returns to block 30 and the login screen appears. If the test in block 70 indicates that the individual is not an FAA Federal Security Manager ("NO" branch) then the individual is not recognized for any available access levels. This indicates that the access level has not been properly set and process flow return to block 30, the login screen. At this point all users have been logged in at their appropriate access level.

Figure 3:
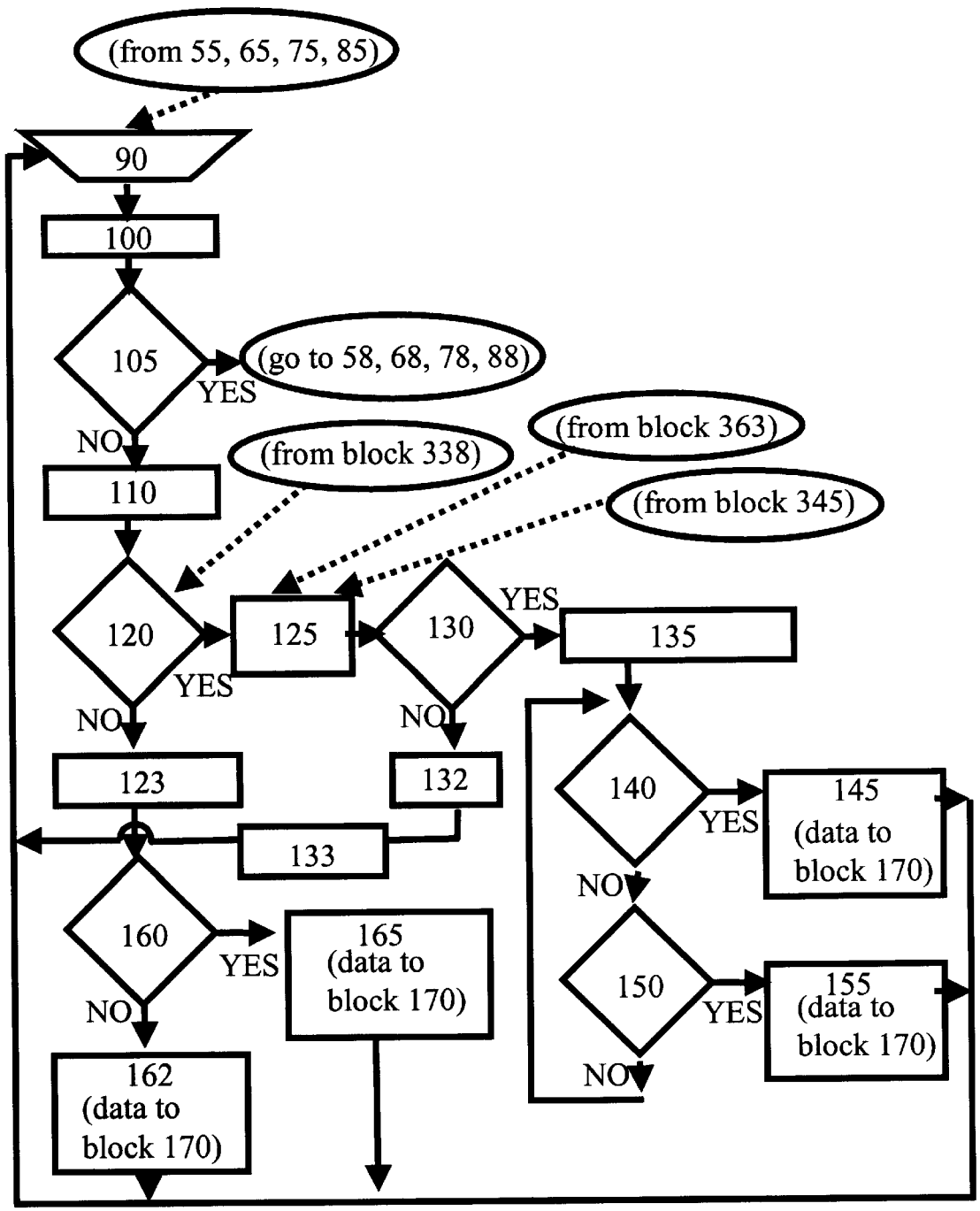
FIG. 3 shows the flow chart of the machine operation, threat projection, and user feedback subroutines of the system of the present invention.

Referring to FIG. 3, the X-ray machine user has chosen to operate the machine (blocks 55, 65, 75, 85). In block 90 a passenger at the checkpoint inserts a bag. This begins the passenger bag screening process. Next, in block 100 the software increases the bag count by 1 to keep track of the number of bags that have been screened. The test in block 105 ascertains if the user wants to log out of machine operation. If the user wants to log out ("YES" branch), then, depending on the user's access level, process flow continues to blocks 58, 68, 78, or 88. If the user does not wish to log out ("NO" branch) then process flow continues to block 110, where the bag's image appears on the X-ray machine monitor for inspection by the security screener.

Block 120 then tests if there is a threat scheduled for projection onto the current passenger bag image. This test is based on threat schedule settings made in block 338. If there is no threat scheduled for projection ("NO" branch), process flow proceeds to block 123, and no simulated baggage image appears on the X-ray machine monitor. Continuing along this path, block 160 tests if the X-ray machine user pressed the "threat" button to indicate that he believed a threat was present. If the user does not press the "threat" button ("NO" branch), which is correct since no threat was projected, process flow proceeds to block 162. In block 162 the system scores the event as a "correct rejection" and the data are sent to block 170. If the user does press the "threat" button ("YES" branch), which is incorrect since no threat was projected, process flow proceeds to block 165. In block 165 the screener is given feedback that he made a "false alarm" since he responded by pressing the "threat" button when no simulated threat was projected. In this block the system also scores the event as a "false alarm" and the data are sent to block 170.

Returning to the test in block 120, if a threat is scheduled for projection into the current passenger bag ("YES" branch), then process flow proceeds to block 125. In block 125 a specific threat is selected from the image library. This selection is based on the threat selection settings made in block 345. Next, block 130 tests if the selected threat fits into the current passenger bag. This test is critical to ensure that a large threat is not projected into a small bag (e.g., a purse), thus cueing the screener that the threat is simulated. If the simulated threat would not fit into the current passenger bag ("NO" branch), process flow proceeds to block 132 and the simulated image projection is aborted. When this occurs it is possible that the screener will see part of the simulated threat as it is initially superimposed on the actual bag. To insure that the screener is not confused by this, feedback is given in block 133 to the screener that a simulated threat was aborted. Process flow then returns to block 90 and awaits a new passenger bag. If the test in block 130 indicates that the simulated threat will fit within the current passenger bag ("YES" branch), then process flow proceeds to block 135 where the simulated threat is projected and superimposed onto the bag image on the X-ray machine monitor.

At this point in the process a simulated threat image has been projected by the system of the present invention. Block 140 tests if the X-ray machine user pressed the "threat" button within a specified time to indicate that he believed a threat was present. If the user does not press the "threat" button ("NO" branch), process flow proceeds to block 150 which tests if the screener response time has elapsed. If the screener response time has not elapsed ("NO" block), and there is time remaining to make a threat detection decision, process flow returns to block 140 and waits for the screener to press the "threat" button. If the screener response time has elapsed and the "threat" button was not pressed ("YES" block), process flow proceeds to block 155. In block 155 the screener is given feedback that he missed the simulated threat since he did not respond by pressing the "threat" button in a timely manner (e.g., 6 seconds). In this block the system also scores the event as a "miss" and the data are sent to block 170.

In block 140, if the user does press the "threat" button ("YES" branch) before the response time elapses, which is correct since a threat was projected, process flow proceeds to block 145. In block 145 the screener is given feedback that he "hit" the simulated threat since he responded by pressing the "threat " button in a timely manner (e.g., 6 seconds). In this block the system also scores the event as a "hit" and the data are sent to block 170.

Figure 4:
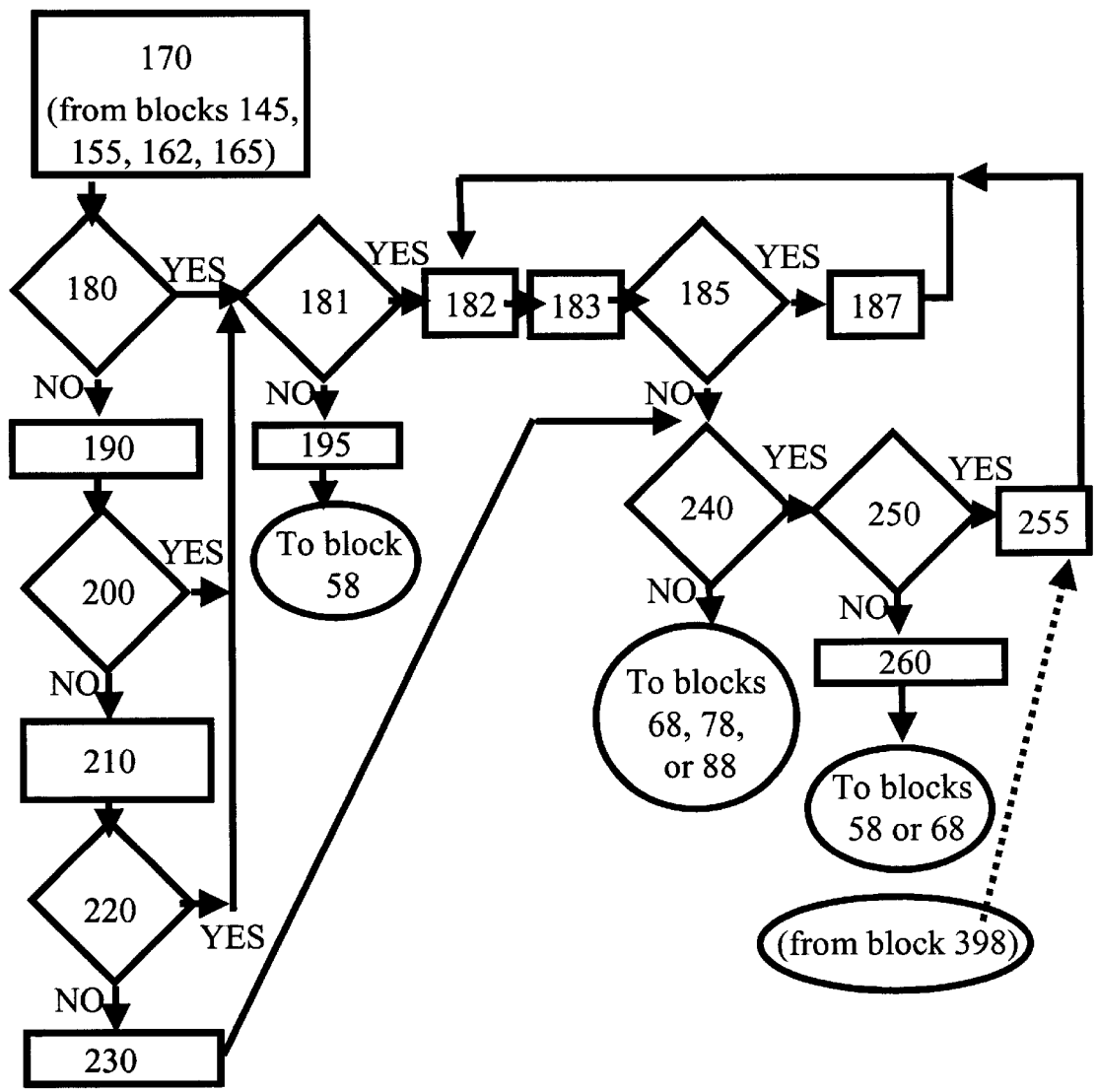
FIG. 4 shows the flow chart of the database, performance reports, and data downloading subroutines of the system of the present invention.

In FIG. 4 the screener performance data (i.e., false alarms, misses, hits, correct rejections) are stored in a database that permits performance reports and data downloads. In block 170 screener performance from blocks 145, 155, 162, and 165 are the data that are stored in the system database. The test in block 180 checks to see if the data in the system have been downloaded from the baggage screening machine in the last 30 days. If the data have not been downloaded in the last 30 days ("NO" branch) then block 190 places a download reminder on the X-ray monitor (block 47). Next, the test in block 200 checks to see if the data in the system have been downloaded in the last 60 days. If the data have not been downloaded in the last 60 days ("NO" branch) then block 200 places an urgent download reminder on the X-ray monitor (block 47). Then, the test in block 220 checks to see if the data in the system have been downloaded in the last 90 days. If the data have not been downloaded in the last 90 days ("NO" branch) then block 230 does not permit machine operation (e.g., the X-ray machine will not scan bags) until the data have been downloaded. This restriction is included because the system currently cannot store more than 3 months of data in memory. Greater memory capacity will permit longer amounts of time before the system requires that the data be downloaded. Process flow continues from block 230 to block 240, where the user is asked if he wants to download the data reports and get the machine to operate once again. See description of block 240 below.

If the data have been downloaded recently (e.g., 90 days or less) then the test in blocks 180, 200, or 220 takes the "YES" branch and program flow proceeds to block 181. Block 181 tests the access level of the user to ensure that they are level 2, 3, or 4. If the user is level 1 ("NO" branch) program flow continues to block 195 which indicates to the user that access is denied and returns him to block 58.

If the test in block 181 indicates that the user is level 2, 3, or 4 ("YES " branch) then process flow continues for viewing or downloading the reports. In block 182 the user selects one of the four available reports (e.g., screener log report). Next, block 183 allows the user to specify the month for the report or a specific screener's name. Block 185 asks the user if he would like to view the selected report. If the answer is "YES" then the process flow continues to block 187 where the report is shown on the X-ray monitor. After the report is viewed the process flow returns to block 182 to permit selection of other reports, months, or screeners. If the user indicates in block 185 that he does not want to view the reports ("NO" branch) then process flow continues to block 240.

Block 240 asks the user if he would like to download the selected report. If the answer is "NO" then the program returns to block 68, 78, or 88 to permit access to other features or to log out. If the answer is "YES" then the program continues to block 250. Block 250 tests the access level of the user to ensure that they are level 3 or 4. If the user is level 1 or 2 ("NO" branch) process flow continues to block 260 which indicates to the user that access is denied and returns him to block 58 or 68. If the test in block 250 indicates that the user is level 3 or 4 then process flow continues to block 255 and the selected report is downloaded to floppy disk or Zip™ disk. After the report is downloaded the process flow returns to block 182 to permit selection of other reports, months, or screeners.

Figure 5:
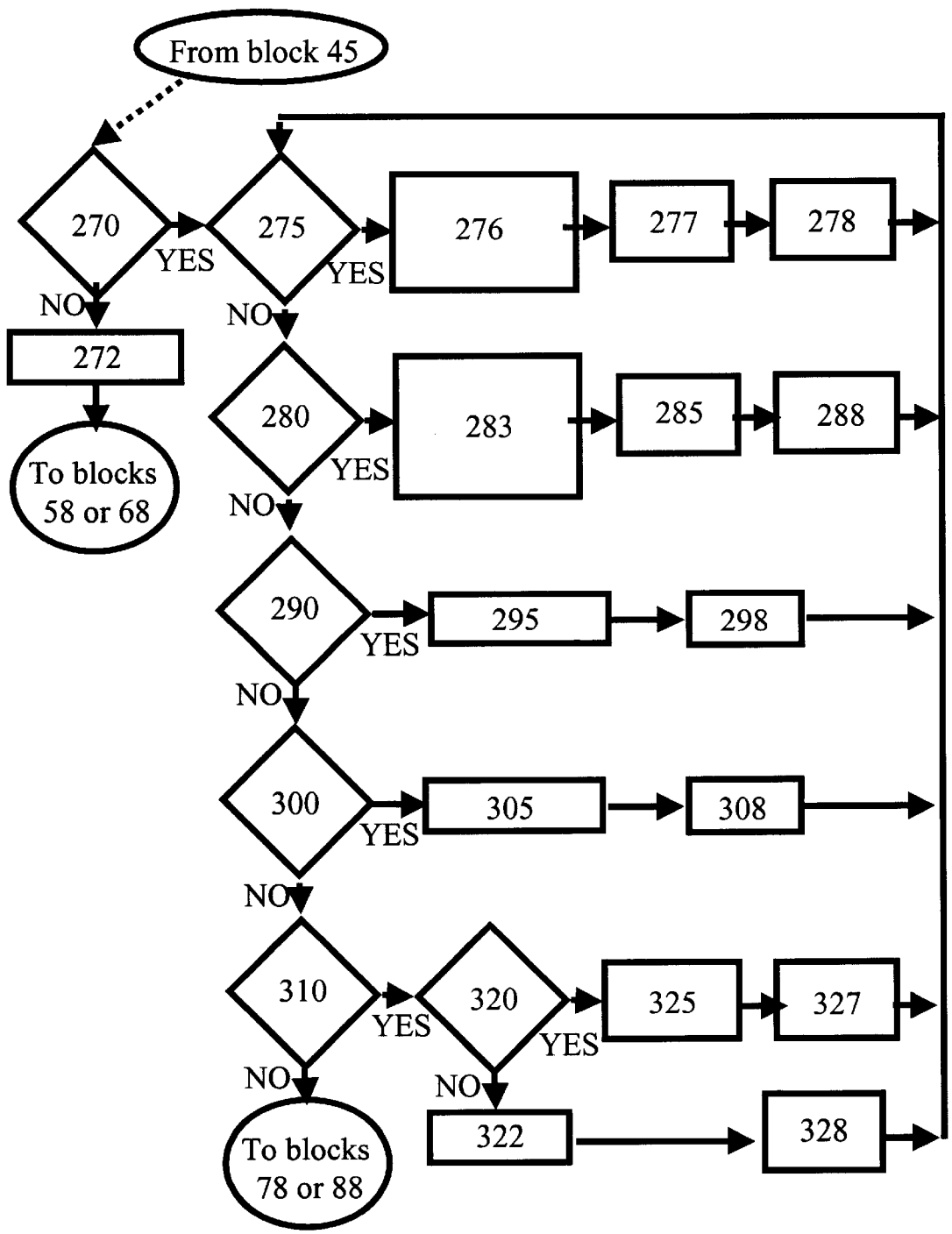
FIG. 5 shows the flow chart of the subroutine for maintaining the user records and passcodes of the system of the present invention.

In FIG. 5, the process of maintaining user records and passcodes is shown in detail. Access to these functions requires that an user be logged into the system (in block 45). Block 270 tests if the user has level 3 or 4 access. If the user is either a screener or CSS (i.e., level 1 or 2) the "NO" branch directs process flow to block 272. Block 272 informs the user that access is denied and then process flow returns to block 58 for a screener or block 68 for a CSS.

In response to the query in block 270, if the user is either level 3 or 4 ("YES" branch), then the process flow proceeds to block 275. Block 275 asks the user if he would like to add information for a new X-ray machine user. If the answer is "YES", the process proceeds to block 276. In block 276 information for a new user (e.g., name, ID number, access level, password) can be entered. Once the information has been added in block 276, the process continues to block 277 where the User ID Master File is amended. This information in block 277 is sent to block 40 to be used to confirm that the user has typed a correct user ID. Next, block 278 updates the Passcode Master File. This information in block 278 is sent to block 43 to be used to confirm that the correct passcode has been entered for system access. After block 278 the process flow returns to block 275.

Block 280 asks the user if he would like to edit user information for a user already in the system. If the answer is "YES", the process proceeds to block 283. In block 283 information for a current user (e.g., name, ID number, access level, password) can be edited. Once the information has been edited in block 283, the process flow continues to block 285 where the User ID Master File is amended. This information in block 285 is used by block 40 to confirm that the user has typed a correct user ID. Next, block 288 updates the Passcode Master File. This information in block 288 is used by block 43 to confirm that the correct passcode has been entered for system access. After block 288 the process flow returns to block 275.

Block 290 asks the user if he would like to query the list for user information for an user already in the system. If the answer is "YES", the process flow proceeds to block 295. In block 295 information for a current user can be sorted from either the top or the bottom of the list. Next, block 298 displays the requested user information. Following block 298 the process flow returns to block 275.

Block 300 asks the user if he would like to display user information for a specific user already in the system. If the answer is "YES", the process flow proceeds to block 305. In block 305 information for a current user can displayed based on either name or the user ID number. Next, block 308 displays the requested user information. Following block 308 the process flow returns to block 275.

Block 310 asks the user if he would like to delete or inactivate user information for an user who has been put in the system but who has not yet screened any bags (i.e. who has quit before completing on-the-job training). If the answer is "NO" then process flow returns to block 78 (for a level 3 user) or block 88 (for a level 4 user). If the answer is "YES", the process flow proceeds to block 320. Block 320 queries if data exist for the specific user. The system is designed so that no data can be deleted. Thus, if user data exist this information can only be inactivated (i.e., not deleted). If the response to block 320 is that no user data exist ("NO" branch), then process flow continues to block 322. Block 322 deletes the request for information for that specific user and displays that this operation has been conducted. Next, block 328 updates the User ID Master File. This information in block 328 is sent to block 43 to be used to confirm that the user ID has been entered. After block 328 the process flow returns to block 275.

If the response to block 320 is that user data exist ("YES" branch), then process flow continues to block 325. Block 325 only permits the information for the specific user to be inactivated. Block 325 displays that this inactivation operation has been conducted. Next, block 327 updates the User ID Master File. This information in block 327 is sent to block 43 to be used to confirm that the user ID has been entered. After block 327 the process flow returns to block 275. "Inactivating" refers to storing, but not deleting, data pertaining to a user who is no longer screening bags (i.e. who is on a leave of absence). These data would not appear in the reports but would still be available for later analysis. If the user returned to work the data would be reactivated.

Figure 6:
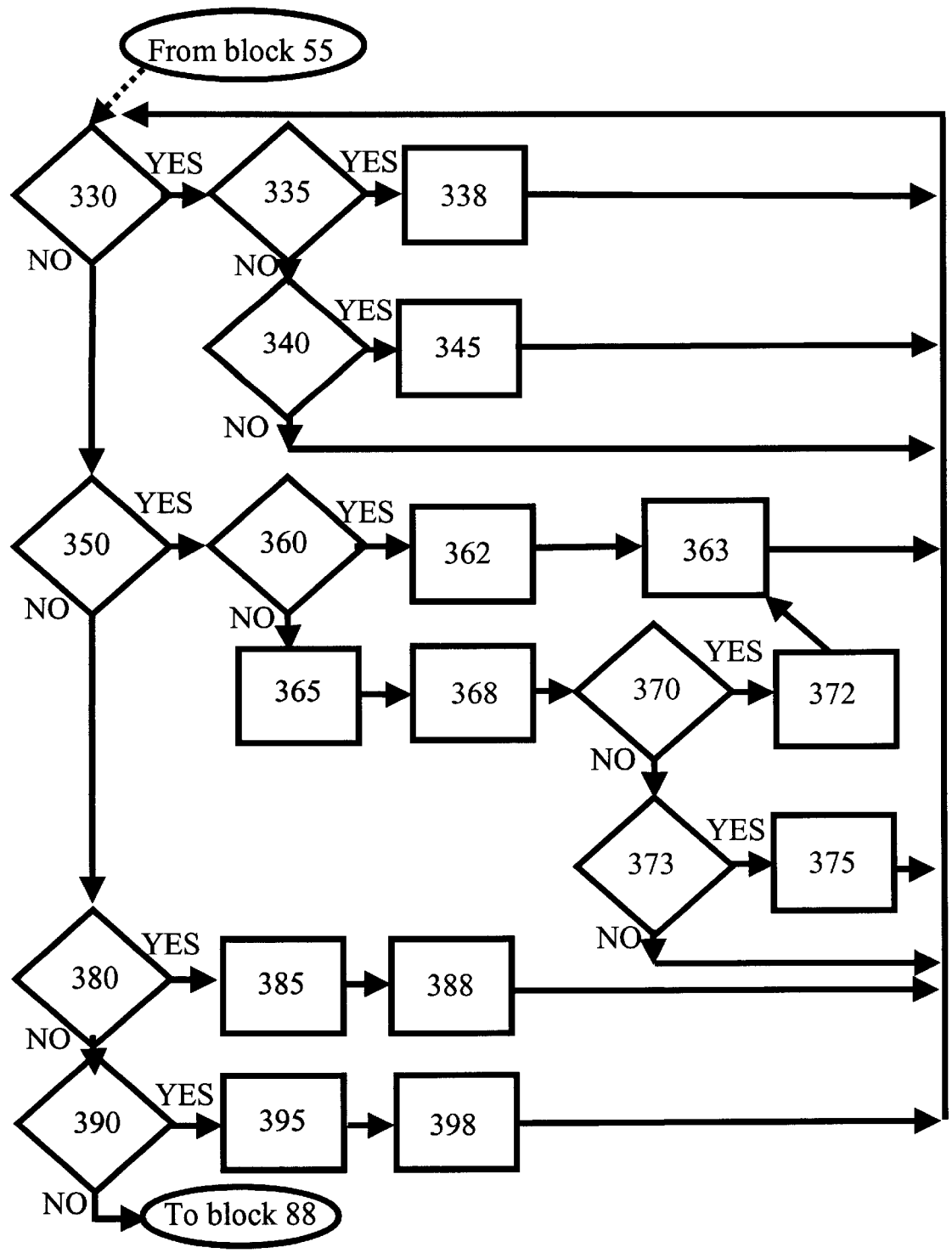
FIG. 6 shows the flow chart for selecting and scheduling threats, and updating the machine site and location data.

FIG. 6 describes the process to select and schedule threats, and to update the site information. The system requires that the site information for each machine be set at installation so that data can be tracked to specific airport sites. The process described in FIG. 6 requires that a level 4 user be logged in to the system (based on data from block 85). Only a level 4 user has access to the threat scheduling and selection features.

The query in block 330 asks the system user (who has already proven he is a level 4 user) if he would like to schedule threats for projection into passenger bags. If the response is "YES" then process flow continues to block 335. Block 335 asks the user if he would like to set the parameters that are used to schedule the frequency of threat projections. If the response is "YES " then process flow continues to block 338. In block 338 the user can set the bag ratio, the bag range, and the randomness ratio. These three parameters link the frequency of simulated threat projections to the flow of bags through the X-ray machine (rather than time). The parameter settings in block 338 are sent to block 120 to control the simulated threat projection schedule and frequency. Following block 338 the process flow returns to block 330.

If the response to block 335 is "NO", indicating the user does not want to set the projection frequency parameters, then process flow continues to block 340. If these parameters have not been set previously, the machine then acts as a conventional X-ray machine. Block 340 asks the user if he would like to set (or change) the percentages of threats (based on threat categories and subcategories) to be projected. If the response is "YES" then process flow proceeds to block 345. In block 345 the user can set the category percentages and the subcategory percentages. The percentages for the categories and subcategories must sum to 100% to be accepted by the system. For example, the bomb category can be selected as 30%, guns 20%, knives 10%, hazardous materials 10%, and combined threat images 30%. Within the bomb category the subcategories could be selected as 15% improvised explosive devices, 10% conventional explosives, and 5% nuclear, biological and chemical devices; within the combined threat image category the subcategories could be bombs 15%, guns 10%, knives 5%, hazardous materials 0%, and other/miscellaneous 0%.

The threat percentage settings in block 345 are sent to block 125 to be used to control the simulated threat selection. Following block 345 the process flow returns to block 330. If the response to block 340 is "NO", indicating the user does not want to set the category or subcategory percentage, then process flow returns to block 330.

If the response to block 330 is "NO", indicating that the user does not want to schedule threats, then the process flow continues to block 350. Block 350 asks the user if he would like to manage the threat image library. This function permits presentation, downloading, and uploading of specific threat images. If the user indicates that he wants to manage the threat image library ("YES" branch) then process flow continues to block 360.

Block 360 asks the user if he would like add or delete a threat category or subcategory. If the response is "YES" then process flow continues to block 362. In block 362 the user can add a category name, add a subcategory name, delete a category name, or delete a subcategory name. Warnings are provided if the user chooses a delete function. Process flow then continues to block 363, where the image library is updated. The updated image library information is sent to block 125. Following block 363 the process flow returns to block 330. If the response to block 360 is "NO" then process flow continues to block 365.

Block 365 permits the user to search the image library by category, subcategory, or a specific threat. Following block 365 process flow continues to block 368. Block 368 permits the user to control which threats will be active in the threat library and available for projection. The user may include/activate all threats in a category or subcategory, or may include/activate a specific threat. Likewise, the user may exclude/deactivate all threats in a category or subcategory, or may exclude/deactivate a specific threat. Next, process flow continues to block 370.

Block 370 asks the user if he wants to upload a new threat image. This feature permits an image that was recorded on another X-ray machine to be uploaded and added to the threat library. If the user wants to upload a threat image ("YES" branch) then process flow continues to block 372. In block 372 the user must enter a unique threat name, enter a description of the threat, specify the path (e.g., the category and subcategory), enter the file name of the threat, and insert a disk. Once this information has been entered and a disk is inserted, the system uploads the threat image from the disk. Following block 372 the process flow returns to block 363.

If the user does not want to upload a threat image in block 370 ("NO " branch) then the process flow continues to block 373. In block 373 the user is asked if he wants to download a threat image. This feature permits an image that was recorded on the X-ray machine to be downloaded so it may be added to the threat image library on other machines. If the user wants to download a threat image ("YES" branch) then process flow continues to block 375. In block 375 the user must select a directory, select a threat image, load a disk (e.g., Zip™ disk) into the X-ray machine, and then the system downloads the threat image. Following block 375 the process flow returns to block 363 where the image library of that particular machine is updated if desired. If the user does not want to download a threat image in block 373 ("NO" branch) then process flow continues to block 330.

If the response to block 350 is "NO", indicating that the user does not want to manage the image library, then the process flow continues to block 380. Block 380 asks the user if he would like to view a specific threat from the threat image library. If the response to the query in block 380 is "YES" then process flow continues to block 385. Block 385 permits the user to search for a specific threat and select it for viewing based on its unique name, after which process flow continues to block 388. Next, in block 388 the image of the selected threat is displayed on the monitor. After block 388 the process flow returns to block 330.

If the response to block 380 is "NO", indicating that the user does not want to view a specific threat from the threat image library, then the process flow continues to block 390. Block 390 asks the user if he would like to update the site information for the X-ray machine. This information must be complete and accurate in order to link downloaded data to the specific X-ray machine that the data came from. If the response to the query in block 390 is "YES" then process flow continues to block 395. Block 395 permits the user to enter or modify the site information, such as the airport location, machine ID number, machine type, and sponsoring air carrier owner. Next, in block 398 the Site Information Master File is updated and the information is provided to block 255 for use when reports are downloaded. After block 398 the process flow returns to block 330.

If the response to block 390 is "NO", indicating that the user does not want to update the site information, then the process flow exits the user out of the selection, scheduling and site information features. The level 4 user is returned to block 88 where other system functions are available.

At the end of a shift, process flow will eventually take the user to block 58, 68, 78, or 88, each of which asks the user if he or she wants to log out. If the answer is yes, the user is logged out and process flow returns to block 30, the log-in screen. The machine stays on, with the log-in screen displayed.

We claim:

1. A means for testing and training baggage screening equipment operators comprising baggage screening equipment including a monitor on which the image of a piece of baggage being screened appears, means for intentionally causing said screening equipment to show the presence of simulated items in baggage being screened, and means for checking to see that said simulated items fit within the piece of baggage being screened.

2. Means for testing as in claim 1 wherein said means for intentionally causing said screening equipment to show simulated items comprises a computer.

3. Means for testing as in claim 2 wherein said computer contains images of said simulated items.

4. Means as in claim 3 including means for causing said computer to project said images onto said monitor.

5. Means as in claim 4 including the capability of overlaying the image of a simulated item on the image of an actual piece of baggage appearing on said monitor.

6. Means as in claim 4 including the capability of inserting a predetermined simulated image of an entire piece of baggage on said monitor rather than the image of actual baggage being screened.

7. Means as in claim 4 including the capability of tracking operator training progress by recording the numbers of correct and incorrect identifications of said images.

8. Means as in claim 7 for providing reports based on said tracking of operator training progress.

9. Means as in claim 4 for varying the rate at which said images are interspersed with images of baggage not containing said images.

10. In a baggage screening system including a monitor the improvement which comprises means for intentionally causing said monitor to show images of simulated items in selected items of baggage being screened and means for checking to see that simulated items fit within said selected items of baggage being screened.

11. The system of claim 10 further including means for varying the rate at which said images are shown.

12. The system of claim 11 further including a computer.

13. The system of claim 12 wherein said computer contains said images of simulated items.

14. The system of claim 13 including means for causing said computer to show said images on said monitor.

15. The method of training baggage screening system operators which comprises providing a baggage screening system including a monitor, providing means for projecting onto said monitor simulated images of contraband onto the image of a piece of actual baggage in said system, providing means for varying the rate at which said images are projected, and providing means for checking to see that said simulated image fits within said piece of actual baggage in said system.

16. The method of claim 15 further including means for determining the accuracy of the operator of said system in detecting said contraband.

* * * * *